Sept. 1, 1959    H. W. DIETERT ET AL    2,902,681
GRAPHIC CONTROL PANEL
Filed Jan. 3, 1956

INVENTORS
HARRY W. DIETERT
BY JOSEPH E. MICKSCH

Whittemore, Hulbert
& Belknap
ATTORNEYS

United States Patent Office 2,902,681
Patented Sept. 1, 1959

2,902,681

GRAPHIC CONTROL PANEL

Harry W. Dietert, Detroit, Mich., and Joseph E. Micksch, Ashtabula, Ohio, assignors to Harry W. Dietert Company, Detroit, Mich., a corporation of Michigan Application January 3, 1956, Serial No. 557,012

1 Claim. (Cl. 340—225)

The present invention relates to a graphic control panel.

It is an object of the present invention to provide a control panel for a plurality of units required to be operated in a particular sequence, control devices for controlling the operation of said units on said panel, a pictorial representation of said units on said panel, and signal lights on said panel associated with said pictorial representation of said units to indicate the condition of said units.

It is a further object of the present invention to provide a control panel for controlling the operation of a plurality of units adapted to be operated automatically in a predetermined cycle, said panel having thereon a pictorial representation of said units, signal lights on said panel associated with the pictorial representation of said units, control means for said units located at least in part on said panel, and circuit means connecting said lights to said units to control energization of said lights to indicate the condition of said units and hence to indicate the progress of said cycle.

Other objects and features of the invention will become apparent as the description proceeds, especially when taken in conjunction with the accompanying drawings, wherein.

The present invention is intended to serve as an aid to the operation of a system comprising a plurality of units, adapted to facilitate control of the system whether the system is operated manually, semi-automatically, or fully automatically. Essentially, the present invention involves the provision of a pictorial representation of the several components of the system, signal lights associated with the several units to indicate the condition of the units, and control means for the units, at least some of which are located on said panel.

Figure 1:
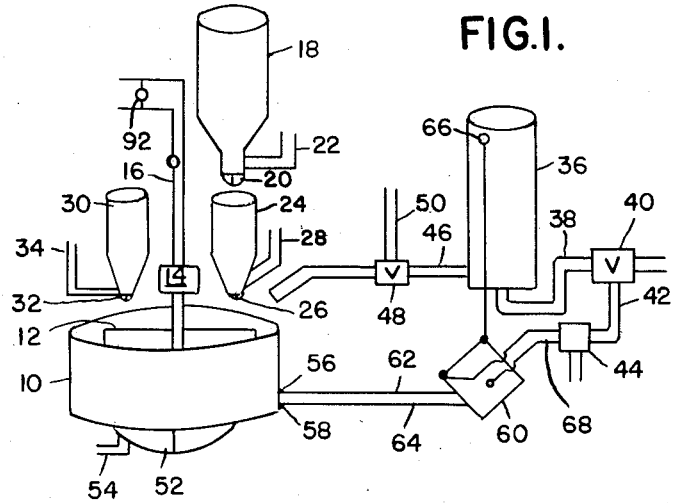
Figure 1 is a diagrammatic representation of a system comprising a number of operating units.

While the particular system with which the control panel is associated is immaterial, there is illustrated herein a system for conditioning or tempering foundry sand. As seen in Figure 1, the system comprises a mixer or muller 10 comprising a container having a rotating blade or blades therein as indicated at 12, adapted to be driven in rotation by an electric motor 14 connected to a source of power by electrical conductors 16. Foundry sand is stored in a bin 18 having discharge gates 20 adapted to be opened and closed by suitable electrically operated means (not shown) connected to a source of power by conductors 22. Disposed beneath the bin 18 in position to receive sand discharged from the bin is a hopper 24 also provided with gates 26 for controlling discharge therefrom. The gates 26 are adapted to be opened and closed by suitable electrically operated mechanism (not shown) connected to a source of power by conductors 28.

In preparing sand for use in casting it is mixed with suitable bonding material and this bonding material is stored in a hopper 30 provided with discharge gates 32 adapted to be opened and closed by suitable electrically operated mechanism (not shown) connected to a source of power by conductors 34.

Water for mixing with the foundry sand is stored in a water tank 36 connected to an inlet pipe 38 which is controlled by a solenoid valve 40, the solenoid of which is connected by conductors 42 to circuit controlling means 44 adapted to be actuated automatically as will be subsequently described.

Extending from the tank 36 to the muller 10 is a discharge pipe 46 adapted to be controlled by a solenoid valve 48, the solenoid of which is connected to electrical conductors 50.

Discharge of the mulled and tempered sand from the muller 10 is controlled by gates 52 adapted to be opened and closed by suitable electrically operated mechanism (not shown) which is connected to electrical conductors 54.

The tempering of the foundry sand is or may be controlled automatically. The factors entering into control of the units illustrated in Figure 1 are the temperature of the sand and its moisture content. In accordance with one manner of controlling the sand suitable temperature responsive means 56 and moisture responsive means 58 are provided in a wall of the mixer 10. The disclosure of Figure 1 is intended to be purely disgrammatic and at 60 in this figure there is indicated an electrical bridge, on leg of which is connected by conductors 62 and 64 to the temperature and moisture measuring devices respectively. Associated with the water tank 36 is a device 66 which is associated with means inside the tank to measure the quantity of water therein.

In accordance with one mode of operation, a quantity of sand in the hopper, which has been received therein from the bin 18, is discharged into the mixer 10. The temperature and moisture content of the sand establishes certain electrical values in the bridge 60. Connected across the bridge are conductors 68 which extend to the circuit controlling means 44 for controlling the condition of the valve 40. Thus, if the temperature and moisture content of the sand in the mixer 10 is such as to require the addition of water, the valve 40 is opened until sufficient water flows into the tank 36 to bring about a state of balance in the bridge by virtue of changes effected in the water measuring device 66. At this time the valve 40 will close and the tank 36 will contain a measured quantity of water just sufficient to bring the moisture content of the sand in the mixer 10 to the required moisture content dependent upon its temperature. If the system is operated in a fully automatic manner, as soon as the appropriate quantity of water has flowed into the tank 36, the valve 40 is closed and the valve 48 opened. The motor 14 may be energized at this time, but preferably prior to this time so that as the water flows into the tank it is thoroughly mixed with the sand and bonding material if employed. Suitable timing means may also be provided for establishing the mixing period. When this period has passed, the gates 52 are opened, discharging properly tempered and mixed sand for use in a foundry.

It will of course be understood that the operation just described is merely exemplary of one of many with which the present invention may be associated. Moreover, the above described manner of tempering foundry sand may be varied. For example, instead of introducing a quantity of water into the tank 36 which is determined by the moisture requirements of sand in the mixer, the valve 40 may be retained open until the tank 36 is filled, and the valve 48 may be opened either continuously or intermittently until sufficient water has flowed into the mixer 10 to bring the sand therein to the required moisture content. At this time the moisture indicating device 58 may be employed to close the valve 48.

Figure 2:
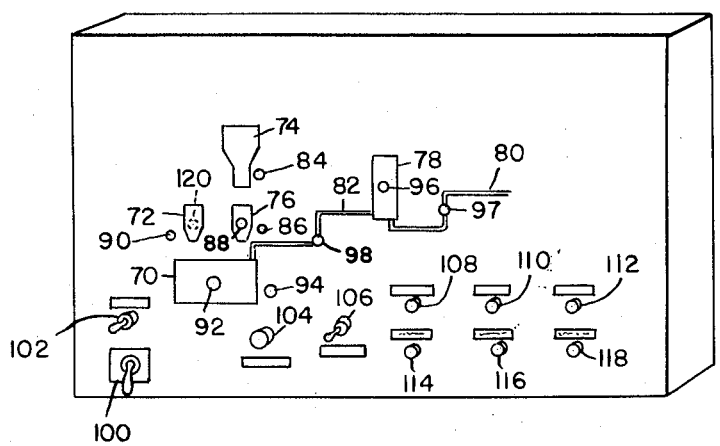
Figure 2 is a control panel for said system constructed in accordance with the present invention.

In any case, and purely by way of example, the control panel illustrated in Figure 2 is designed for association with the system shown in Figure 1. Provided on the face of the panel is a pictorial representation of the units making up the control system. Thus, the control panel 1 contains a pictorial representation 70 of the mixer 10, a pictorial representation 72 of the binder hopper 30, a pictorial representation 74 of the sand bin 18, a pictorial representation 76 of the sand hopper 24, a pictorial representation 78 of the water tank 36, a pictorial representation 80 of the inlet pipe 38, and a pictorial representation 82 of the discharge pipe 46.

Associated with the pictorial representation 74 of the bin is a signal light 84. Associated with the pictorial representation 76 of the hopper are a pair of signal lights 86 and 88. Associated with the pictorial representation 72 of the binder hopper is a signal light 90. Associated with the pictorial representation 70 of the muller or mixer are signal lights 92 and 94. Dependent upon the particular manner in which the system is operated, there may be a signal light 96 associated with the pictorial representation 78 of the water tank, or signal lights 97 and 98 may be associated respectively with the pictorial representations 80 and 82 of the inlet and discharge pipes respectively.

It will be appreciated that control devices and circuit elements for controlling operation of the several units of the system will be mounted at the rear of the panel. At the front of the panel in position for actuation by the operator are actuating means for the control devices. A selector switch actuator 100 is provided for conditioning the control circuits for automatic or semi-automatic operation. A main control switch is provided having an off-on actuator 102. An actuator in the form of a push button 104 is provided for starting a semi-automatic cycle. A switch having an actuator 106 is provided for controlling the opening and closing movement of the gates 32 of the binder hopper 30. A push button 108 is connected to control opening and closing movement of the gates 52 of the mixer 10. A push button 110 is provided for controlling opening and closing movement of the gates 26 to control discharge of sand from the hopper 24 into the mixer 10. Push button 112 is adapted to control flow of water to the tank 36 and hence, is connected to control solenoid valve 40. Push button 114 is adapted to control gates 20 which in turn control discharge of foundry sand from the bin 18 to the hopper 24. Push button 116 is adapted to control flow of water from the tank 36 to the mixer 10 and hence is connected to control solenoid valve 48. Push button 118 may be connected to control the addition of slurry to the tank instead of water if desired.

As previously indicated, the present system may be fully automatic, in which case, initiation of the gates of the units and associated apparatus so far described may be by operation of means not shown herein, such for example as a requirement for additional tempered sand at a remote point. If however, the complete apparatus as illustrated herein, is set for semi-automatic by appropriate position of the selector switch 100, initiation of a cycle may be as a result of momentary pressure on push button 104. It is of course assumed that at this time the actuator 102 is in the "on" position. While the exact sequence of operation may be varied as desired, the operation may in this instance be initiated by opening movement of the gates 20 to discharge sand into the hopper 24 and when the predetermined amount of sand is in the hopper 24 the gates 20 of the bin 18 may be automatically closed. After the predetermined quantity of sand has been measured out into the hopper 24 it may be discharged into the mixer 10 by opening of the gates 26, after which the gates may close. At this time the motor 14 which has been started prior to the start of the cycle, operates to mix the sand in the mixer and to bring different portions thereof into contact with the temperature and moisture measuring devices 56 and 58. At the same time, if a bonding material is to be added the gates 32 may be opened for a predetermined interval or in a manner to discharge a predetermined quantity of the bonding material into the sand in the mixer. Assuming that the sand in the mixer requires the addition of water, the electrical condition of the bridge 60 maintains the switch or circuit control means 44 closed to open the solenoid valve 40 to cause water to flow into the tank 36. When a sufficient quantity of water has flowed into the tank as measured by the indicating device 66, the bridge reaches a state of balance and the valve 40 is de-energized. At this time the valve 48 may be opened simultaneously and the predetermined measured quantity of water discharged through the pipe 46 into the mixer 10.

Suitable timing means (not shown) may be provided for predetermining a mixing interval during which the mixer operates. Upon conclusion of this mixing interval, the gates 52 open automatically and the predetermined measured and tempered foundry sand is discharged for use.

Throughout this cycle if it is carried out in an automatic manner, it is desirable for the operator to observe the stage of completion of the cycle. Accordingly, the signal lights which have been referred to are connected in such a way as to indicate the condition or state of operation of the units. Thus for example, signal light 84 associated with the pictorial representation 74 of the bin 18 may be so connected into the electrical system including the conductors 22 as to be lit when the gates 20 are opened. Thus, the light 84 when lit is an indication that sand is discharging from the bin 18 to the hopper 24. In like manner, the signal light 86 may be associated with the control circuit for the sand hopper 24 in such a way as to be lit when the gates 26 are opened. If desired, the signal light 88 may be provided which will be lit when the hopper 24 is filled with sand and the gates 26 closed. In like manner, the signal light 90 may be so associated with the electrical control circuit for the bonder hopper 30 as to be lit when the gates 32 are opened. If desired, another signal light such as indicated in dotted lines at 120, may be associated with the pictorial representation 72 of the bonder hopper 30 to indicate the presence of the bonding material in the hopper 30.

The pictorial representation 70 of the mixer or muller 10 may be provided with the signal lights 92 and 94. The light 92 for example, may be associated with the electrical control circuit for the motor 14 in such a way as to be energized when the motor is driving the blades 12. In Figure 1, the signal light 92 is indicated as in parallel with the motor. The signal light 94 is preferably connected to the circuit controlling the gates 52 in such a way as to be lit when the gates 52 are opened to discharge tempered sand for use.

Signal lights 97 and 98 are associated with the electrical control circuits for the solenoid valves 40 and 48 respectively so as to indicate open or closed condition thereof. Thus for example, when the lights 97 or 98 are lit, they may represent that the corresponding valve is open. The signal light 96 as associated with the pictorial representation 78 of the water tank 36 may be employed when the system is connected so as to maintain the tank 36 filled and to control discharge therefrom in accordance with moisture content of the sand.

Preferably, to facilitate manual control, the several push buttons and particularly 108, 110, 112, 114, 116 and 118, may be associated in color with the signal lights. Thus for example, the push buttons 112 and 116 may have a distinctive color the same as the signal lights 96, 97 and 98, since all of these push buttons and signal lights relate to the portion of the system concerned with the addition of water. In the same manner, push buttons 108, 110 and 114 and signal lights 84, 86, 88, 92 and 94 may all be of the same distinctive color since all relate to the addition or processing of the sand.

When the system is operated automatically as above described, the exact stage of completion of the cycle is readily apparent to the operator by a glance at the pictorial representation of the system, where the particular signal lights which are lit will indicate the condition of the several units.

If the complete system is to be operated manually the graphic control panel is also highly useful in a different manner. The graphic representation of the system gives the operator a complete picture as to the relationship between the operating elements and permits him to determine the manner in which the several elements should be controlled. Thus for example, having introduced the required quantity of sand and bonding material into the mixer, the operator under manual operation, may add water by proper sequential control of the valves 40 and 48 by the sequential operation of the push buttons 112 and 116. The condition of the signal lights on the graphic panel may also prevent improper operation, as for example, discharge of sand from the bin 18 to the hopper 24 at a time when the gates 26 thereof are open although preferably the control switches are electrically interlocked to prevent improper operation.

The drawings and the foregoing specification constitute a description of the improved graphic control panel in such full, clear, concise and exact terms as to enable any person skilled in the art to practice the invention, the scope of which is indicated by the appended claim.

What we claim as our invention is:

A sand tempering system comprising a container having rotating mixing members therein and a discharge gate on said container, a hopper above said container having a discharge gate for discharging sand from said hopper to said container, a water tank, a passage having a first valve therein leading to said tank and controlling flow of water to said tank, a passage between said tank and container having a second valve therein controlling supply of water to said container, a control panel having thereon a graphic representation of said container, hopper, tank, water passages, and valves, separate switches on said panel for controlling the gates on said hopper and on said container, and the said first and second valves, a pair of signal lights associated with the representation of said hopper to indicate respectively that the hopper is filled and the position of the hopper discharge gate, a pair of signal lights associated with the container to indicate respectively that the mixing members are operating and the position of the container discharge gate, a signal light associated with said tank to indicate the water content of said tank, and a signal light associated with each valve to indicate the position of each valve.

References Cited in the file of this patent

UNITED STATES PATENTS

| | | |
|---|---|---|
| 2,159,925 | Wood | May 23, 1939 |
| 2,263,797 | Christensen | Nov. 25, 1941 |
| 2,526,057 | Whitley | Oct. 17, 1950 |
| 2,678,431 | Lewis | May 11, 1954 |

OTHER REFERENCES

Ser. No. 412,280, Moulet (A.P.C.), published June 8, 1943.